US007389052B2

(12) United States Patent
Oettinger et al.

(10) Patent No.: US 7,389,052 B2
(45) Date of Patent: Jun. 17, 2008

(54) CALIBRATION METHOD FOR STATION ORIENTATION

(75) Inventors: Eric Gregory Oettinger, Rochester, MN (US); Mark David Heminger, Rochester, MN (US); Mark D. Hagen, Rochester, MN (US)

(73) Assignee: Texas Instruments Incorporated, Dallas, TX (US)

( * ) Notice: Subject to any disclaimer, the term of this patent is extended or adjusted under 35 U.S.C. 154(b) by 943 days.

(21) Appl. No.: 10/060,549

(22) Filed: Jan. 30, 2002

(65) Prior Publication Data

US 2003/0144041 A1 Jul. 31, 2003

(51) Int. Cl.
*H04B 10/10* (2006.01)
*H04B 10/24* (2006.01)

(52) U.S. Cl. .................. 398/129; 398/127; 398/128
(58) Field of Classification Search ........ 398/121–123, 398/129, 131
See application file for complete search history.

(56) References Cited

U.S. PATENT DOCUMENTS

| | | | | |
|---|---|---|---|---|
| 5,119,225 A * | 6/1992 | Grant et al. | ................. | 398/123 |
| 5,465,170 A * | 11/1995 | Arimoto | ..................... | 398/129 |
| 5,592,320 A * | 1/1997 | Wissinger | .................. | 398/121 |
| 5,684,614 A * | 11/1997 | Degura | ........................ | 398/131 |
| 5,953,146 A * | 9/1999 | Shelby | ........................ | 398/131 |
| 5,973,310 A * | 10/1999 | Lunscher | ................. | 250/203.1 |
| 6,178,024 B1 * | 1/2001 | Degura | ........................ | 398/129 |
| 6,285,481 B1 * | 9/2001 | Palmer | ........................ | 398/119 |
| 6,347,001 B1 * | 2/2002 | Arnold et al. | ............... | 398/122 |
| 6,381,055 B1 * | 4/2002 | Javitt et al. | ................... | 398/131 |
| 6,469,815 B1 * | 10/2002 | Poon et al. | .................. | 398/131 |
| 6,483,621 B1 * | 11/2002 | Adams et al. | ............... | 398/130 |
| 6,504,634 B1 * | 1/2003 | Chan et al. | .................. | 398/129 |
| 6,522,440 B1 * | 2/2003 | Poon et al. | .................. | 398/131 |
| 6,556,324 B1 * | 4/2003 | Meier | .......................... | 398/129 |
| 6,577,421 B1 * | 6/2003 | Cheng et al. | ............... | 398/129 |
| 6,690,888 B1 * | 2/2004 | Keller et al. | ................. | 398/129 |
| 6,813,446 B1 * | 11/2004 | Melendez et al. | ........... | 398/131 |
| 6,915,080 B2 * | 7/2005 | Heminger et al. | ........... | 398/129 |
| 2002/0097472 A1 * | 7/2002 | Oettinger et al. | ............ | 359/172 |
| 2002/0181055 A1 * | 12/2002 | Christiansen et al. | ........ | 359/159 |
| 2003/0043435 A1 * | 3/2003 | Oettinger et al. | ............ | 359/159 |
| 2005/0276608 A1 * | 12/2005 | Pavelchek | .................... | 398/135 |

* cited by examiner

*Primary Examiner*—Kenneth Vanderpuye
*Assistant Examiner*—David S Kim
(74) *Attorney, Agent, or Firm*—William B Kempler; W. James Brady, III; Frederick J. Telecky, Jr.

(57) ABSTRACT

In optical wireless networks, light beams are transmitted over-the-air and maximum performance is achieved when light beams are aligned with corresponding light detectors. A feedback control system is created between transmitting and receiving units, wherein the receiving unit provides positional data about the light beam from the transmitting unit. The transmitting unit uses the data provided to make adjustments to its light beam. However, in order to use the positional data, the units must be operating with a common coordinate basis. A method is provided for determining the basis and generating the transformation needed to modify positional data from one unit into information that is useful for the other unit. Additionally, a method is presented for using the positional data to maintain proper alignment of the light beam.

12 Claims, 8 Drawing Sheets

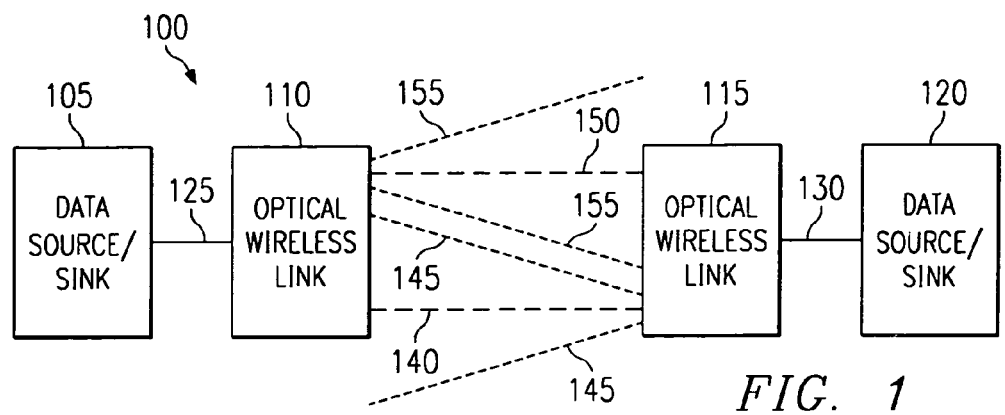
FIG. 1
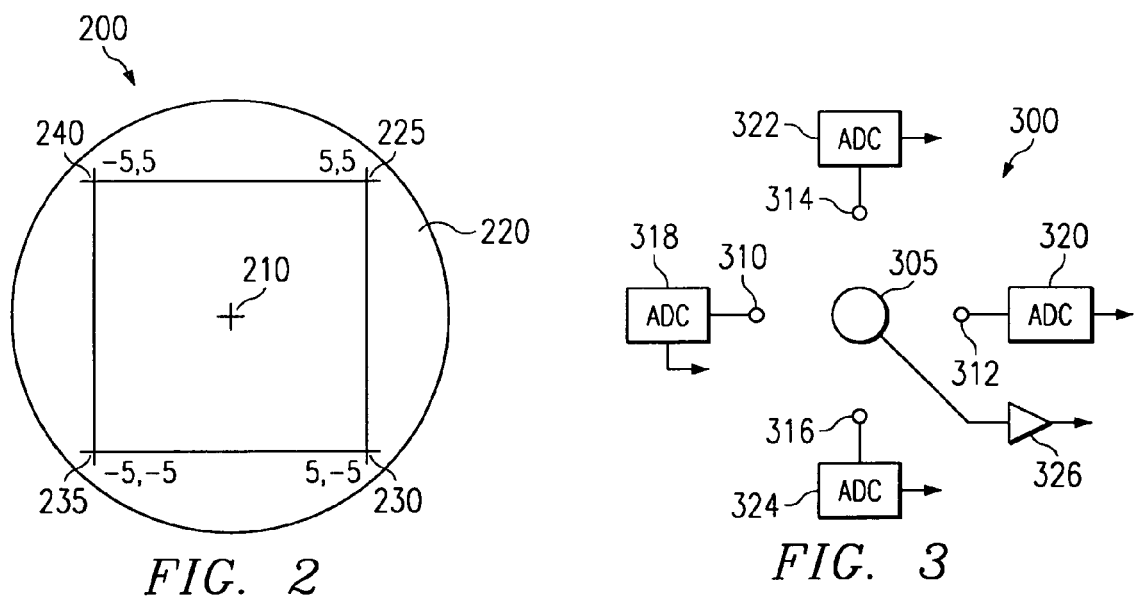
FIG. 2
FIG. 3
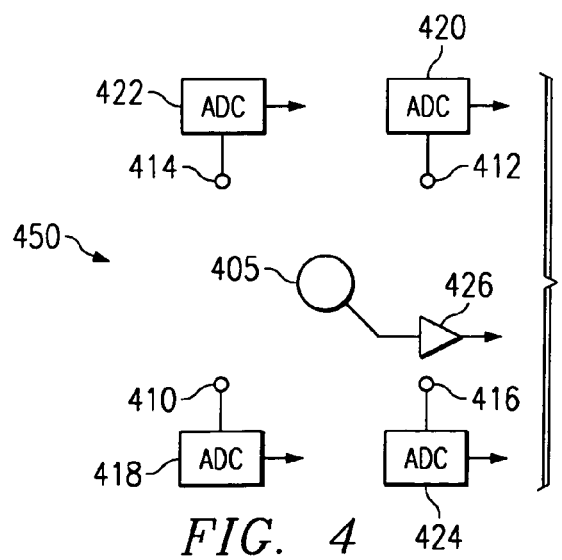
FIG. 4

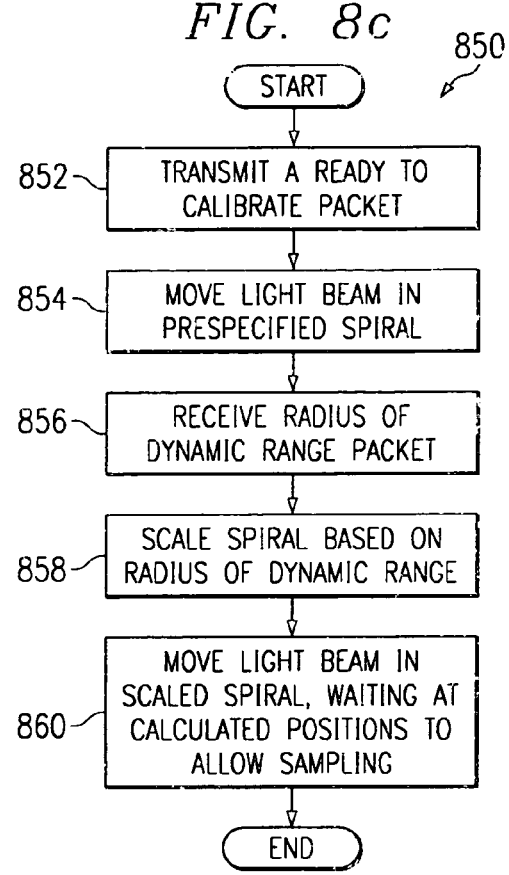
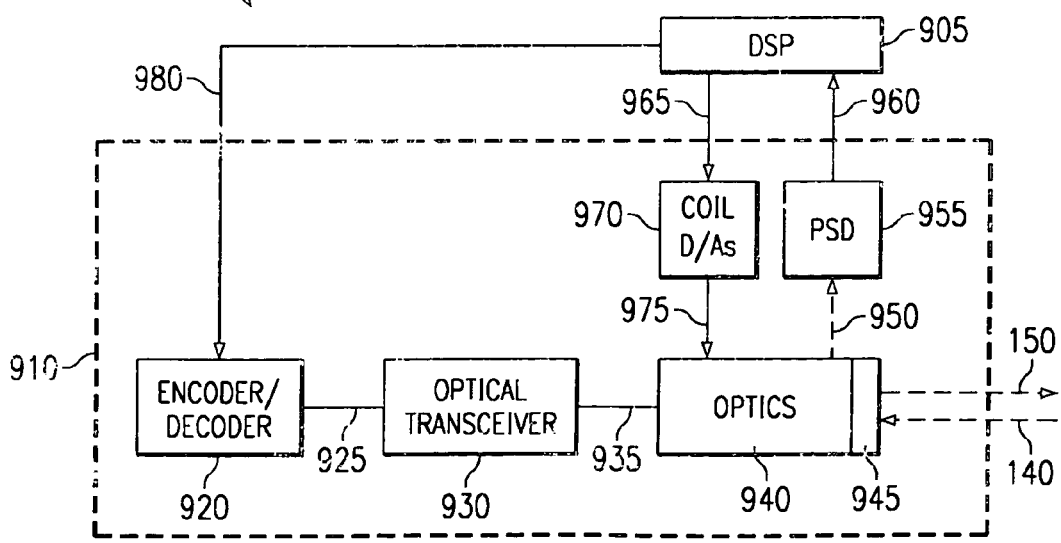

CALIBRATION METHOD FOR STATION ORIENTATION

CROSS REFERENCE TO RELATED APPLICATION

The following co-pending, co-assigned patent applications are related to the present invention. Each of the applications is incorporated herein by reference.

| Ser. No. | Filing Date | Attorney Docket |
| --- | --- | --- |
| 09/839,690 | Apr. 20, 2001 | TI-31429 |
| 09/923,510 | Aug. 6, 2001 | TI-31440 |
| 60/285,461 | Apr. 20, 2001 | TI-32924 |

FIELD OF THE INVENTION

This invention relates generally to optical wireless communications, and more specifically, to creating a common basis between communicating optical wireless links to permit maximum performance.

BACKGROUND OF THE INVENTION

Modern data communications technologies have greatly expanded the ability to communicate large amounts of data over many types of communications facilities. This explosion in communications capability not only permits the communications of large databases, but has also enabled the real-time (and beyond) digital communications of audio and video content. This high bandwidth communication is now carried out over a variety of facilities, including telephone lines (fiber optic as well as twisted-pair), coaxial cable such as supported by cable television service providers, dedicated network cabling within an office or home location, satellite links, and wireless telephony.

Each of these conventional communications facilities involves certain limitations in their deployment. In the case of communications over the telephone network, high-speed data transmission, such as that provided by digital subscriber line (DSL) services, must be carried out at a specific frequency range so as to not interfere with voice traffic, and is currently limited in the distance that such high-frequency communications can travel. Of course, communications over "wired" networks, including the telephone network, cable network, or a dedicated network, requires the running of the physical wires among the locations to be served. This physical installation and maintenance is costly, as well as limiting to the user of the communications network.

Wireless communication facilities overcome the limitation of physical wires and cabling, and provide great flexibility to the user. Conventional wireless technologies involve their own limitations, however. For example, in the case of wireless telephony, the frequencies at which communications may be carried out are regulated and controlled. Furthermore, current wireless telephone communication of large data blocks, such as video, is prohibitively expensive, considering the per-unit-time charges for wireless services. Additionally, since it is common to have multiple users within a certain frequency range, wireless telephone communications are subject to interference among the various users within the nearby area. Radio frequency data communication must also be carried out within specified frequencies, and is also vulnerable to interference from other transmissions and sources of noise. Satellite transmission is also currently expensive, particularly for bi-directional communications (i.e., beyond the passive reception of television programming).

A relatively new technology that has been proposed for data communications is the optical wireless network. According to this approach, data is transmitted by way of modulation of a light beam, in much the same manner as in the case of fiber optic telephone communications. A photoreceiver receives the modulated light, and demodulates the signal to retrieve the data. As opposed to fiber optic-based optical communications, however, this approach does not use a physical wire for transmission of the light signal. In the case of directed optical communications, a line-of-sight relationship between the transmitter and the receiver permits a modulated light beam, such as that produced by a laser, to travel without the use of an optical fiber as a waveguide. Optical wireless communications is inherently secure because in order to snoop on the transmission, the transmission would need to be broken. A broken transmission link is readily detected.

It is contemplated that the optical wireless network according to this approach will provide numerous important advantages. First, high frequency light can provide high bandwidth, for example ranging from on the order of 100 mega-bits-per-second (Mbps) to several giga-bits-per-second (Gbps), when using conventional technology. Additionally, this high bandwidth need not be shared among users, when carried out over line-of-sight optical communications between transmitters and receivers. Without other users on the link, of course, the bandwidth is not limited by interference from other users, as in the case of wireless telephony. Modulation can also be quite simple, as compared with multiple-user communications that require time or code multiplexing to permit multiple simultaneous communications. Bi-directional communication can also be readily carried out according to this technology. Finally, optical frequencies are currently not regulated, and as such no licensing is required for the deployment of such networks.

These attributes of optical wireless networks make this technology attractive both for local networks within a building, and also for external networks between buildings. Indeed, it is contemplated that optical wireless communications may be useful in data communication within a room, such as for communicating video signals from a computer to a display device, such as a video projector.

The communications between two optical wireless links involves the light beams from one optical wireless link impinging upon a photodetector on the other optical wireless link. To successfully align the light beams, the optical wireless links undergo an alignment procedure that results in the nominal alignment of the light beams. Following the alignment procedure, a more fine scale procedure is used to fine-tune the alignment of the light beams. To finely position the light beams, a feedback control system is created using positional data (and/or positional commands) transmitted over the light beams. The data and/or commands issued by one optical wireless link are used to make adjustments to the position of the light beam originating at the other optical wireless link. The feedback control system may remain in use during normal operation to ensure optimal performance.

It will be apparent to those of ordinary skill in the art of the present invention that the precise alignment of the light beam between the optical wireless links is a critical factor in the proper operation of the optical wireless network. To facilitate the precise alignment of the light beam using the feedback control system when the two optical wireless links can be arbitrarily installed, a common basis needs to be established. If a common basis is not established between the communicating optical wireless networks, one optical wireless link may respond in a manner that is inconsistent with the intended directions of the other wireless link. For example, if the optical wireless links were installed such that they were 180 degrees out of alignment with each other, a very real possibility if one is installed on a wall and the other is installed on an opposite facing wall, then one optical wireless link's command to move the light beam in an upward direction would actually result in the other optical wireless link moving the light beam in a downward direction because it's upward direction is truly the first optical wireless link's downward direction.

Therefore, a need exists in the art for a way to generate a common basis to permit the exchange of information for use in accurate station orientation determination.

SUMMARY OF THE INVENTION

In one aspect, the present invention provides a method for providing a common coordinate bases between two optical wireless units wherein information is transmitted between the optical wireless units via light beams, the method comprising the steps of: at the first optical wireless unit, moving the light beam in a prespecified pattern; at the second optical wireless unit, determining reference positions, determining a basis for the plurality of optical detectors, sensing the light beam using a plurality of optical detectors, calculating measured positional data based on the sensed light beam, calculating a set of coefficients using the basis and measured positional data, and transforming positional data measured at the second optical wireless unit with the coefficients prior to transmitting the positional data to the first optical wireless unit.

In another aspect, the present invention provides a method for providing a common coordinate basis between two optical wireless units wherein information is transmitted between the optical wireless units via light beams, the method comprising the steps of: at the first optical wireless unit, moving the light beam in a first prespecified pattern, receiving detector range data from the second optical wireless unit, and moving the light beam in a second prespecified pattern; at the second optical wireless unit, determining detector range, transmitting the detector range, determining reference positions, and generating a table of detector readings.

In yet another aspect, the present invention provides a method for maintaining an aligned light beam in an optical wireless network comprising the steps of: at a source optical wireless unit, receiving positional data from a destination optical wireless unit, and adjusting the position of the light beam if needed; and at a destination optical wireless unit, polling a set of servo detectors for positional data, transmitting the positional data to the source optical wireless unit.

The present invention provides a number of advantages. For example, use of a preferred embodiment of the present invention permits the generation of a common reference point between communicating optical wireless links so that commands and instructions from one optical wireless link can be accurately executed on the other optical wireless link.

Also, use of a preferred embodiment permits a substantial portion of the calculations needed to generate a common reference point to be calculated prior to use, therefore, these calculations can be performed ahead of time and saved. Therefore, the calculations need not be performed in real-time. This reduces the amount of computational power required from the processing element of the optical wireless link.

Additionally, use of a preferred embodiment provides a way to maintain the proper positioning of the light beam to maximize performance. The accurate positioning of the light beam is verified and adjusted periodically to ensure that the light beam remains properly positioned.

BRIEF DESCRIPTION OF THE DRAWINGS

The above features of the present invention will be more clearly understood from consideration of the following descriptions in connection with accompanying drawings in which:

FIG. 1 illustrates a wireless optical networking system with two optical wireless links according to a preferred embodiment of the present invention;

FIG. 2 illustrates a field of view of an optical wireless link according to a preferred embodiment of the present invention;

FIG. 3 illustrates an arrangement of photodetectors of an optical wireless link according to a preferred embodiment of the present invention;

FIG. 4 illustrates an alternative arrangement of photodetectors of an optical wireless link according to a preferred embodiment of the present invention;

FIGS. 8a-d illustrate algorithms for determining coefficients required for generating a common basis using different techniques according to a preferred embodiment of the present invention; and FIG. 9 illustrates an optical unit according to a preferred embodiment of the present invention.

DETAILED DESCRIPTION OF ILLUSTRATIVE EMBODIMENTS

Figure 5A:
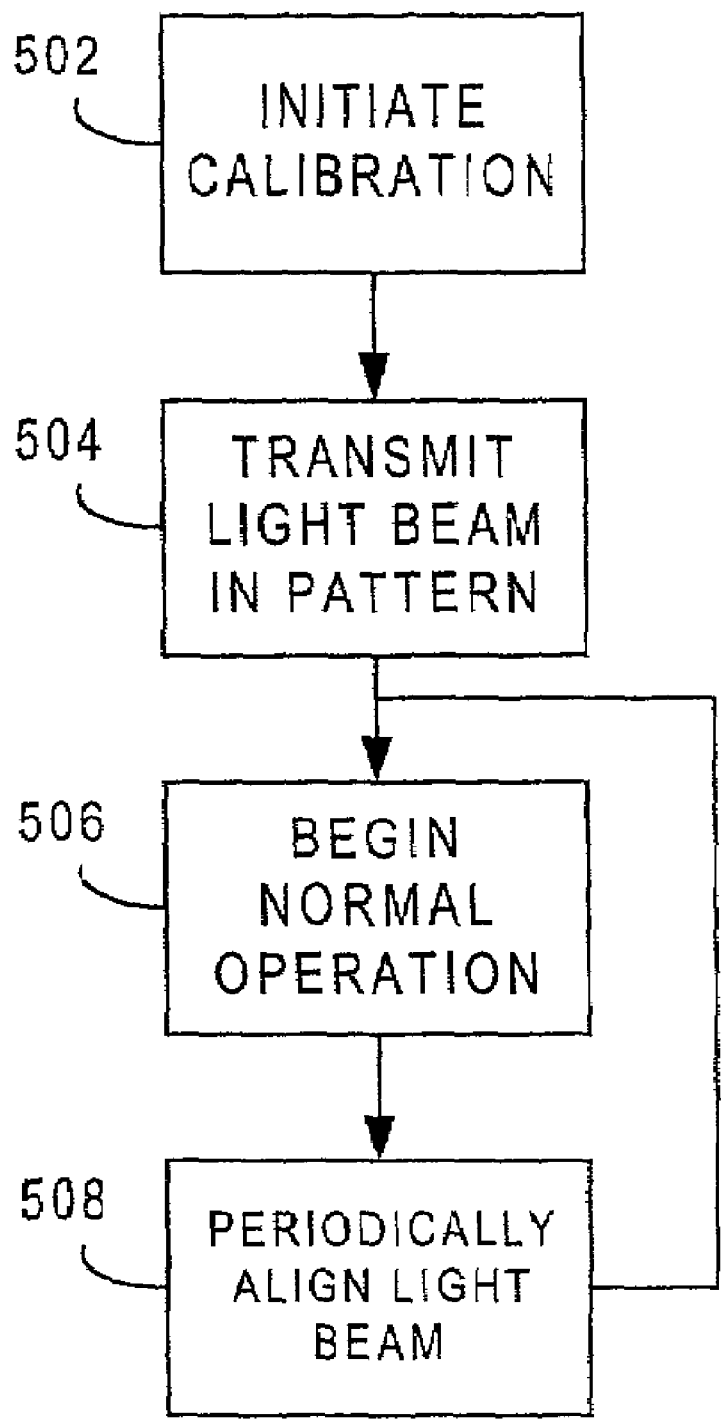
FIGS. 5a-b illustrate the operation of transmitting and receiving optical wireless links after completing the alignment process and beginning normal network operations according to a preferred embodiment of the present invention.

The making and use of the various embodiments are discussed below in detail. However, it should be appreciated that the present invention provides many applicable inventive concepts, which can be embodied in a wide variety of specific contexts. The specific embodiments discussed are merely illustrative of specific ways to make and use the invention, and do not limit the scope of the invention.

FIG. 1 illustrates a preferred embodiment optical wireless system 100, including a first data source/sink 105 connected to a first Optical Wireless Link ("OWL") 110. The OWL 110 can both transmit to and receive data from a second OWL 115 over a wireless optical path. The second OWL 115 is in turn connected to a second data sink/source 120. Preferably each OWL device is an optical path-to-sight modem. As used herein, the term path-to-sight is intended to mean an unobstructed optical path (which may include reflections)

generally through the air, as contrasted with through an optic fiber whose path is controlled by the optical fiber. An advantageous feature of the OWL devices is that the optical beam is a narrow, collimated light beam, such as provided by a laser or collimated laser diode. The narrow beam allows for a lower power laser source to be used, because the optical power is concentrated in a small area. While this provides an advantage in terms such as lower power consumption, it provides a commensurate disadvantage that it is difficult to align the collimated light beam to the receiving photodetector (due to the relatively small beam size). This disadvantage becomes more pronounced as the distance between the two OWLs increases, since a small angular misalignment becomes more pronounced as the overall beam length is increased.

Data sink/sources 105 and 120 could be any type of data device, such as a computer, a LAN network, an Ethernet device, a multi-media distribution source, a music player, a video projector or television, a telephony device or switch, and the like. Data sink/sources 105 and 120 communicate with OWLs 110 and 115, respectively over a data connections 125 and 130, respectively. These data connections (e.g., twisted pair, coaxial cable, fiber optic) are typically physical connections operating under a standard protocol, such as Ethernet, TCP/IP, ATM, and the like. Data connections 125 and 130 could also be radio frequency (RF) based wireless connections in some applications. Alternatively, OWLs may connect directly with data sink/sources via a communications bus interface. For example, an OWL with a PCI bus interface may be inserted into an empty PCI bus slot on the motherboard of a personal computer.

The OWL 110 communicates with the OWL 115 over a collimated light beam 150. The OWL 110 has a field of view 155 and the receiver of the OWL 115 must be positioned within the field of view 155 for effective communication. Likewise, the OWL 115 has a field of view 145 in which it can transmit a collimated light beam 140 to the receiver of the OWL 110. Inherently, the signal-to-noise ratio (SNR) is maximized when the light beams 140 and 150 are centered on the photo-receivers of the receiving units 110 and 115, respectively. The alignment of the light beam can be detected as a function of received optical power, signal intensity, and the like and this detected alignment information can then be fed back to the transmitter. According to a preferred embodiment of the present invention, there is a mechanism for controllably steering the light beam. In addition to data to and from data source/sink 120, the OWL 115 transmits the light beam alignment feedback signals to the OWL 110 over light beam 140. Likewise, the OWL 110 transmits beam alignment feedback signals to the OWL 115 over its light beam 150, in addition to data to or from data source/sink 105. Because light beams 140 and 150 are high bandwidth, low latency paths, the transmission of feedback signals over the beams allows for rapid alignment of the beams (low latency) without degrading the data handling capabilities of the system (high bandwidth). In the preferred embodiments, the OWL devices 110 and 115 communicate with each other using standard 100 Mbps Ethernet protocol. The inventive concepts described herein apply equally to other communication protocols, including but not limited to ATM, TCP/IP, SONET, IEEE 1394, IRDA, 10 Mbps Ethernet, 100 Mbps Ethernet, Gigabit Ethernet, and other alternatives within the purview of one of ordinary skill in the art of the present invention.

Details regarding the apparatus and method for communicating alignment control signals between the OWLs 110 and 115 are provided in co-pending, commonly assigned patent application Ser. No. 09/923,510, filed Aug. 6, 2001, entitled "System and Method for Embedding Control Information within an Optical Wireless Link" and incorporated herein by reference.

In the preferred embodiments, the OWL 110 and the OWL 115 are mounted to respective fixtures for operation. Examples of fixture might include affixing an OWL within the housing of a personal computer, mounting an OWL to a wall with a bracket, positioning an OWL on a counter-top, desk-top, or other work surface, mounted on a cubical wall, and the like. The primary requirement for the fixture is that it affixes the OWL relatively stably in the proper position vis-à-vis another OWL with which it is desired to communicate over line-of-sight beams 140 and 150. A first level of alignment is provided by positioning the OWLs 110 and 115 in their respective fixtures such that the two devices have their beam transmitters generally pointing toward each other, as shown in FIG. 1. Although a fixture is preferable in order to minimize the likelihood that the OWL will be moved out of alignment, it is not necessary for the teachings of the present invention that a fixture be employed. In some embodiments, the OWL will be simply placed on a work surface and pointed in the direction of a remote OWL. One skilled in the art will recognize that care should be taken to ensure that the OWL will not be unduly disturbed or moved during operation.

In the preferred embodiments, each OWL has beam steering capability providing a field of view 200 of ten degrees in both an X-axis and a Y-axis, as shown in FIG. 2. This beam steering capability is preferably provided by a micromirror that can be controlled via microactuators. However, the actual light beam transmitter itself may be steerable.

The neutral, or default position for the light beam is in the center of the field of view, as indicated by point 210. The beam can be deflected as much as five degrees along the X-axis, in either direction, and as much as five degrees in either direction along the Y-axis. Hence, point 225 illustrates the beam having been deflected five degrees positively along the X-axis and five degrees positively along the Y-axis. Point 230 illustrates where the light beam would point when it is deflected five degrees positively along the X-axis and five degrees negatively along the Y-axis. Likewise, point 235 illustrates where the light beam would point when it has been deflected five degrees negatively in both the X- and Y-axes, and point 240 illustrates the beam having been deflected five degrees negatively in the X-axis and five degrees positively in the Y-axis. Of course, the beam could be deflected less than five degrees in either direction, and hence the beam could be deflected to point anywhere within the field of view 200.

Also shown in FIG. 2 is the field of view 220 of receiving OWL 115. This represents the area for which the photodetector of the receiving OWL can detect an incoming light beam. Because the photodetector of receiving device has a round field of view, the light beam deflection will preferably be limited to an area within the round area 220. According to a preferred embodiment of the present invention, the field of view 220 of receiving OWL 115 should be larger than the area covered by the light beam deflection.

A co-pending patent application Ser. No. 60/285,461, filed Apr. 20, 2001, entitled "Method and apparatus for aligning optical wireless links", commonly assigned herewith and incorporated herein by this reference, discloses a method for aligning optical wireless links. The patent application discloses a method wherein two optical wireless links are nominally aligned with each other so that each OWL's photodetector lie within the field of view of the other OWL. Each OWL then begins by sweeping its beam in an expanding spiral pattern. The spiral pattern continues to increase until it has expanded to its maximum diameter, at which point, the beam is swept through a decreasing spiral pattern. At some point, the light beam from one OWL will impinge upon the photodetector of the other OWL and positional data is exchanged. After light beams from both OWLs impinge on the photodetector of the other OWL, the shared positional data is used to nominally align the light beam of the two OWLs.

While the method of aligning the two OWL units using only the optical photodetectors and a sweeping laser beam yields an accurate result, it is a time consuming operation. During normal operations, it is desired to maintain the alignment of one OWL's light beam on the other OWL's photodetector with as little overhead as possible. To do this, additional servo detectors are incorporated into the receiving unit. The servo detectors generate real-time light beam position error measurements. These measurements (or data derived from the measurements) are transmitted back to the transmitting OWL on a periodic basis.

Referring now to FIG. 3, a figure schematically illustrates a preferred embodiment of a photodetector, such as would be employed in the optical module 210 of OWLs 110 and 115. The photodetector comprises a data detector 305 and four servo detectors, two along the X-axis and two along the Y-axis and identified by reference numerals 310, 312, 314, and 316, respectively. Data detector 305 is preferably a Si PIN detector and is connected to a pre-amplifier 326 where the received signal is amplified before being passed to signal amplifying and processing circuitry (not shown) as is well known to those skilled in the art.

Servo detectors 310-316 are preferably low bandwidth light-to-voltage converters containing an integrated amplifier such as a TAOS 254. Each servo detector is coupled to an analog to digital converter where the intensity of the light impinging upon the associated servo detector is converted into a digital value proportionate to the light intensity. By comparing the digital values from ADCs 318, 320, 322, and 324 (corresponding to the light intensity at servo detectors 310, 312, 314, and 316, respectively), the alignment of the impinging light beam relative the centrally located data detector can be determined.

As an example, assuming the value being received from ADC 322 is higher than the value being received from ADC 324, this would indicate that the light beam is misaligned and in impinging above the center of data detector 305. By feeding this information back to the transmitter, as described above, the beam can be re-positioned to impinge lower upon data detector 305. Likewise, if the value being received from ADC 324 is higher than for ADC 322, this would indicate that the beam is too low and needs to be adjusted upwards. As discussed above, these parameters are fed back to the transmitting unit wherein the light beam is re-directed to more precisely align the beam.

According to a preferred embodiment of the present invention, the data detector 305 is used to receive the incoming light beam. Additionally, during the alignment process, the data detector 305 is used to detect the scanning light beam. The servo detectors 310, 312, 314, and 316 are used to fine-tune the alignment of the light beam. The servo detectors are not used during the alignment process. It is only after the completion of the alignment process and during the generation of the reference point that the servo detectors are used. As stated above, the differences in the digital values generated by the ADCs associated with the servo detectors are used to determine the alignment (or misalignment) of the light beam. This information is then used to calculate the reference point.

Referring now to FIG. 4, a figure illustrates another preferred embodiment configuration for the photodetector, wherein the servo detectors are located on 45° axes relative the centrally located data detector 405. This configuration is preferable in that two detectors can be used for determining the alignment in the X-axis and two detectors for determining alignment in the Y-axis. In other words, under the configuration illustrated in FIG. 4, the relative value of both servo detectors 416 and 412 compared to both servo detectors 414 and 410 would be used for alignment in the X direction, and the relative value of servo detectors 414 and 412 to servo detectors 416 and 410 would be compared for alignment in the Y direction.

After the OWLs have been nominally aligned, their alignment needs to be fine-tuned. In order to fine-tune the alignment of the OWLs, a feedback control system is setup between the OWLs using the optical links between the two OWLs to provide conduits for the feedback information. The feedback control system provides the transmitting OWL with information regarding the position of its light beam on the receiving OWL. According to a preferred embodiment of the present invention, the transmitting OWL periodically will request positional data regarding its light beam from the receiving OWL.

Referring now to FIG. 5a, a flow diagram illustrates the operation of a transmitting OWL after completing the alignment process according to a preferred embodiment of the present invention. After alignment, the transmitting OWL initiates a calibration procedure by transmitting a calibration packet to the receiving OWL (block 502). According to a preferred embodiment of the present invention, the calibration packet contains information such as when the transmitting OWL will start scanning its light beam, the scanning pattern for the light beam (if a choice is permitted), frequency of positional data transmission, etc. After transmitting the calibration packet, the transmitting OWL begins to transmit the light beam (block 504). According to a preferred embodiment of the present invention, the light beam follows the specified scan pattern, such as the increasing spiral pattern, and periodically transmits positional data of its location. Alternative scanning patterns may be used, such as raster, square, and triangular patterns, as long as both the transmitting and receiving OWLs know the specific scanning pattern being used. As the light beam traverses the pattern, positional data is transmitted on the light beam. According to a preferred embodiment of the present invention, the period of the spiral pattern is 5 khz and the frequency of the transmission of the positional data is 4 khz, although other spiral frequencies and sampling rates are also operable as long as both the transmitting and receiving OWLs use the same scan pattern parameters.

After the transmitting OWL completes the specified scan pattern for the light beam, it begins its normal operation (block 506). According to a preferred embodiment of the present invention, part of the normal operation involves the establishment of a feedback control system with the receiving OWL. The feedback control system uses the optical links as conduits for carrying control information. The feedback control system is used to maintain accurate positioning of the light beam with respect to the data detector of the receiving OWL to ensure maximum performance.

The transmitting OWL continuously aligns its light beam using the periodically transmitted positional data from the receiving OWL (block 508). According to a preferred embodiment of the present invention, each unit sends light beam positional information in a special control data packet, referred to as a servo control data packet, and the transmitting OWL uses that data to update the alignment of its light beam. The frequency of the transmissions of the control packets is again, an agreed upon frequency. For example, the agreed upon frequency may be 4 khz, or once every 250 micro-seconds. If the frequency is too high, then the OWLs may be reducing the overall performance of the optical network by flooding the network with control packets and increasing the load on processing elements within the OWLs with requests, measurements, transformations, etc. If the frequency is too low, the light beam may be given too much time to move out of alignment and the fine adjustments may not be sufficient to re-align the light beam, possibly forcing a repeat of the alignment and calibration procedures.

The servo control data packets are interleaved with normal data packets using one of the method described in the patent application Ser. No. 09/923,510, filed Aug. 6, 2001, entitled "System and Method for Embedding Control Information within an Optical Wireless Link" (block 506). In this way, normal network traffic can be transmitted simultaneously with the control packets. The frequency of the transmission of the servo control data packets is a trade-off between data throughput and alignment disturbance rejection. The higher the servo position error sample rate, the better the OWL can reject disturbances such as vibrations in the wall to which the OWL is mounted. However, a higher sample rate means that more data transmission capacity needs to be allocated for transmitting the servo control data packets.

Figure 5B:
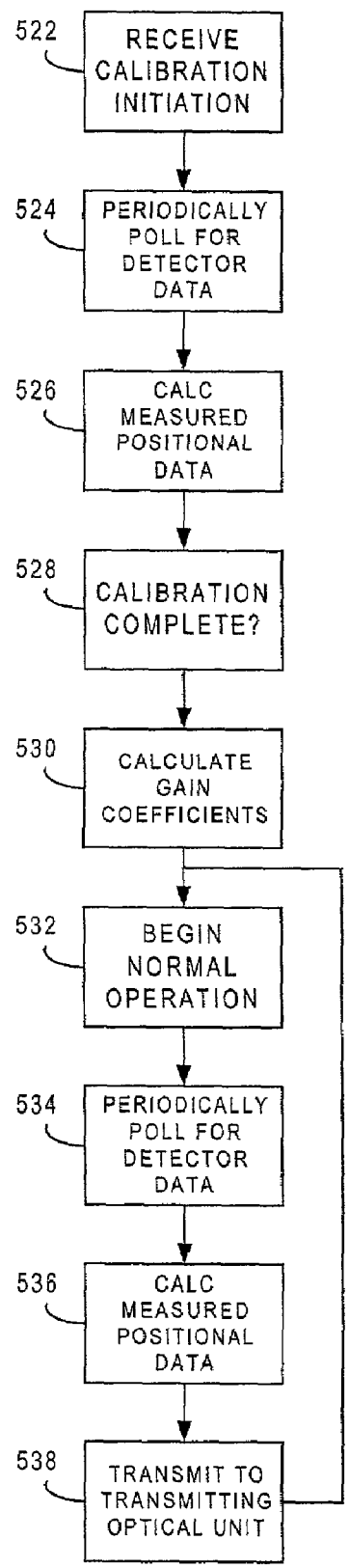

Referring now to FIG. 5b, a flow diagram illustrates the operation of a receiving OWL after completing the alignment process according to a preferred embodiment of the present invention. After the receiving OWL receives the calibration initiation packet from the transmitting OWL (block 522), it begins to periodically poll the analog-to-digital converters coupled to its servo detectors for data (block 524). As discussed above, the frequency of the polls, along with information regarding the particular scan pattern used by the transmitting OWL and other necessary information, is transmitting in the calibration initiation packet or they may be fixed and not permitted to change.

The data from the servo detectors (gathered through the analog-to-digital converters) is used to calculate measured position data (block 526). The measured position data is then stored along with the expected position of the light beam. The expected position of the light beam is known because the scan pattern of the light beam is known as well as the amount of time expired since the beginning of the calibration procedure. This is repeated until the calibration procedure completes (block 528).

With the completion of the calibration procedure, the receiving OWL calculates the common basis by determining a set of gain coefficients (block 530) and saves them for later use. The gain coefficients, when multiplied with positional data as measured by the receiving OWL, transform the positional data measured by the receiving OWL into positional data that is of the same basis as positional data from the transmitting OWL. After saving the gain coefficients, the receiving OWL begins normal operations (block 532), just like the transmitting OWL.

Periodically, the receiving OWL will poll the analog-to-digital converters coupled to the servo detectors for data (block 534). As discussed previously, the frequency of the polls is agreed upon by both the transmitting and receiving OWLs or it may be fixed. The receiving OWL then converts the data into measured positional data (block 536) and converts the measured positional data into a form that is usable by the transmitting OWL by multiplying the data with the set of gain coefficients. A discussion of the measured positional data is presented below. The positional values, constructed in this manner are then periodically transmitted back to the transmitting OWL (block 538) and the receiving OWL continues normal operations (block 532).

Figure 6A:
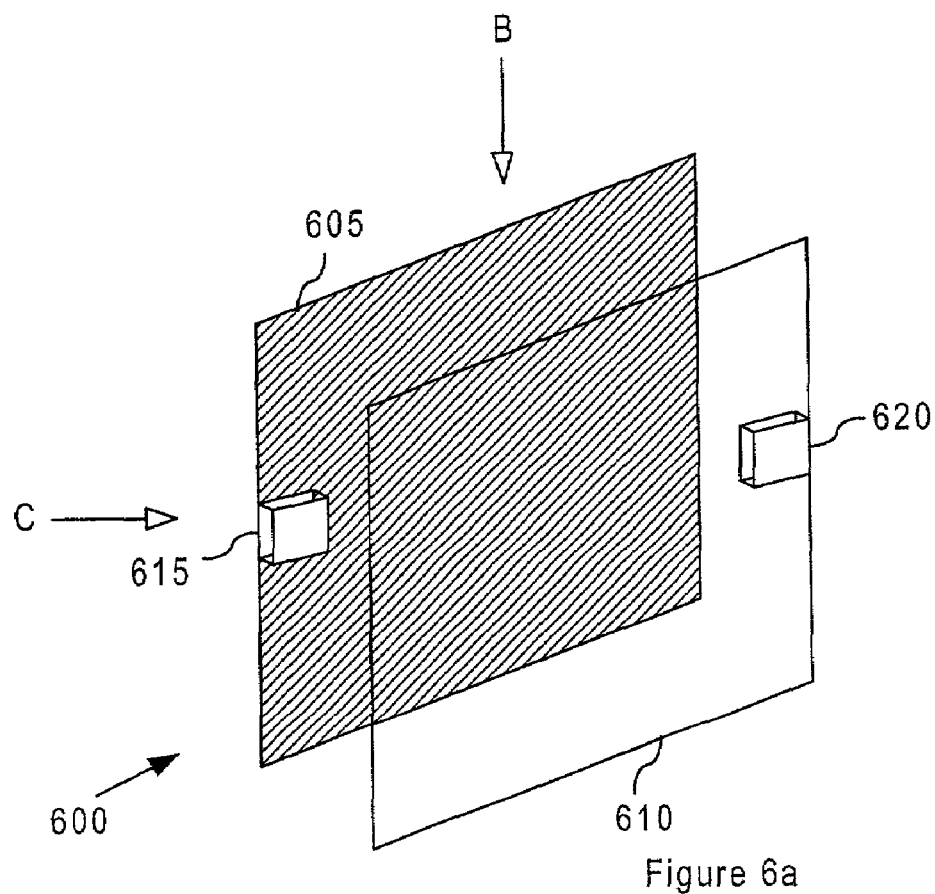
FIGS. 6a-c present differing views of a typical installation for a pair of optical wireless links, displaying the importance of creating a common basis according to a preferred embodiment of the present invention.

Referring now to FIG. 6a, a diagram illustrates a plan view of an exemplary installation of a portion of an optical wireless network 600 with two OWLs mounted on walls according to a preferred embodiment of the present invention. The portion of the network 600 is mounted on two walls 605 and 610 and comprises two OWLs 615 and 620, with the OWL 615 being mounted on the wall 605 and the OWL 620 being mounted on the wall 610. An example of such a network installation would be connecting two existing networks that are separated by a long hallway and the OWL 615 connected to one network and the OWL 620 connected to the other network.

Figure 6B:
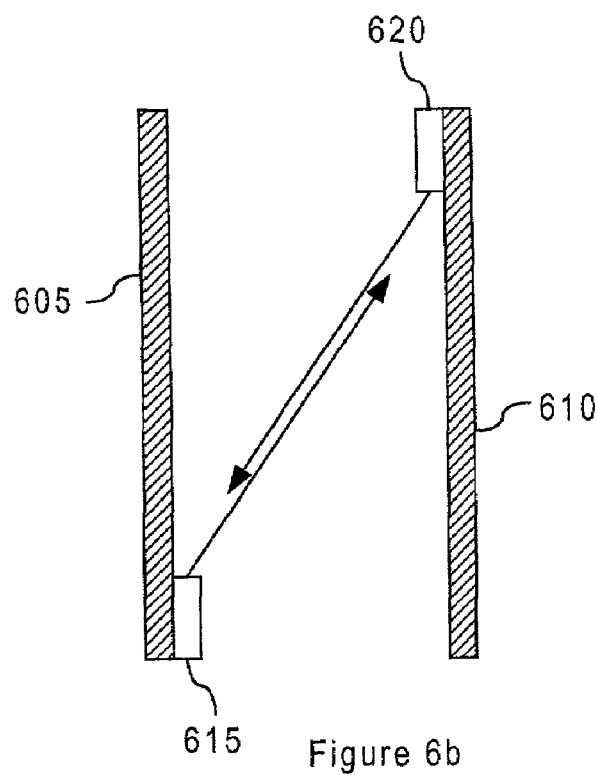

Referring now to FIG. 6b, a diagram illustrates a view of the portion of the optical wireless network 600 displayed in FIG. 6a, where the view is along line B from FIG. 6a according to a preferred embodiment of the present invention. FIG. 6b provides a top-down view of the wireless network 600. FIG. 6b clearly shows that the OWL 615 is mounted on the opposite wall 605 to the wall 610 to which the OWL 620 is mounted.

Figure 6C:
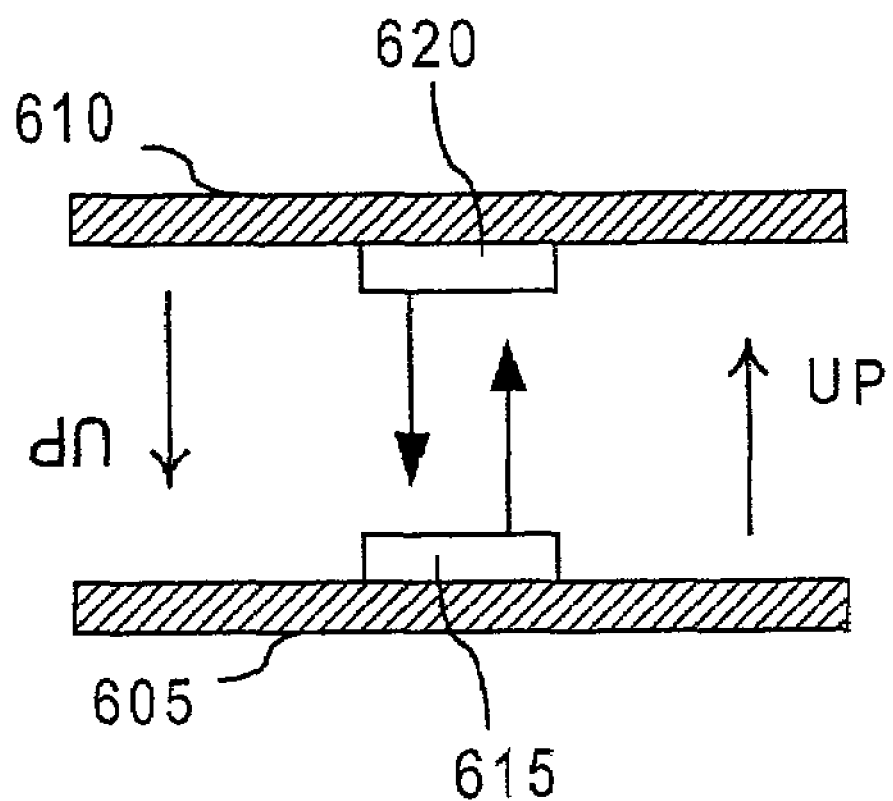

Referring now to FIG. 6c, a diagram illustrates a view of the portion of the optical wireless network 600 displayed in FIG. 6a, where the view is along line C from FIG. 6a according to a preferred embodiment of the present invention. FIG. 6c provides a sideways view down the long hallway made by the walls 605 and 610, and clearly shows that for the OWL 615, the UP direction is opposite of the UP direction for the OWL 620. Therefore, should the OWL 620 tell the OWL 615 to move its light beam in the UP direction, the net result would be the light beam moving in the DOWN direction for the OWL 620.

Perhaps a more common situation is for the two OWLs to be a small number of degrees out of kilter with one another. This difference may be the result of walls that are not plumb or tables that are not flat or differences in manufacturing between various units. While the difference may be a relatively small number of degrees and not the 180 degrees described above, it may still be sufficient to make it difficult to finely tune the alignment of the light beams of the OWLs, therefore resulting in reduced system performance.

Figure 7:
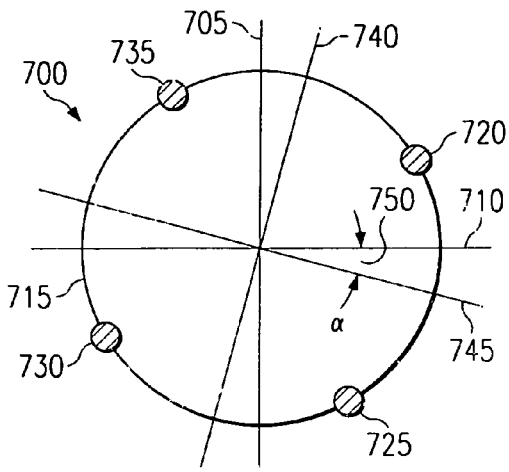
FIG. 7 illustrates a pair of coordinate axes 700 wherein the coordinate axes displays the differing views of the same data due to different bases existing at the transmitting and receiving units according to a preferred embodiment of the present invention.

Referring now to FIG. 7, a diagram displays a pair of coordinate axes 700 wherein a first coordinate axes (lines 705 and 710) displays the coordinate axes of an OWL that is transmitting and a second coordinate axes (lines 740 and 745) displays the coordinate axes of an OWL that is receiving the light beam according to a preferred embodiment of the present invention. The pair of coordinate axes 700 displays the difference in the coordinate axes of the transmitting and receiving OWLs. As stated previously, the difference may be the result of how the OWLs are mounted, where the OWLs are mounted, and manufacturing differences between different OWL units.

Also displayed in FIG. 7 is a circle 715 representing the position of the servo detectors as well as the servo detectors 720, 725, 730, and 735. Each of the servo detectors are given a name: servo detector 720 is referred to as NE or NorthEast, servo detector 725 is SE (SouthEast), servo detector 730 is SW (SouthWest), and servo detector 730 is NW (NorthWest).

The coordinate axes (lines 705 and 710) of the transmitting OWL are plumb and square while the coordinate axes (lines 740 and 745) of the receiving OWL are rotated by a number of degrees, α, displayed as an arc 750 with respect to the coordinate axes of the transmitting OWL. The coordinate axes of the transmitting OWL are plumb and square because in FIG. 7, the axes of the transmitting OWL are the reference axes. Simply put, α is the rotation of line 705 to line 740. To simplify discussion, the lines in each of the coordinate axes are also given names: line 705 is referred to as $y_{cmd}$, line 710 is $x_{cmd}$, line 740 is $y_{sense}$, and line 745 is $x_{sense}$.

In order for proper fine-tuning of the position of the light beam compensation must be provided for the rotation α. In actuality, compensation must also be provided for an offset and a gain. The offset may result if there exists a different bias voltage on the output of any of the four servo detectors. While the necessity of a gain calibration is due to the fact that the desired basis of the constructed position is in an angular deflection of the light beam. However, the servo detectors are a fixed distance apart from each other. For example, this implies that a given voltage difference from the detectors will represent a different angular deflection of the light beam if the OWLs are positioned two meters apart as compared to when they are 50 meters apart. The gain calibration effectively converts a spatial beam position error measurement into an angular position error measurement.

Referring back to FIG. 7, expressions describing ycmd and xcmd as a function of $y_{sense}$ and $x_{sense}$ and the servo detectors are possible. First, begin by expressing $x_{sense}$ and $y_{sense}$, the positional data as detected by the receiving OWL, as a function of its servo detectors. The information provided by the servo detectors (NE, NW, SE, and SW) along with $gain_x$, $gain_y$, $offset_x$, and $offset_y$, which are calculated from the information provided by the servo detectors.

$$x_{sense} = gain_x(NE-SW-NW+SE)+offset_x$$

$$y_{sense} = gain_y(NE-SW+NW-SE)+offset_y \quad (1)$$

Then, $y_{cmd}$ and $x_{cmd}$, the positional data as provided by the transmitting OWL, can be expressed as functions of $x_{sense}$ and $y_{sense}$ and the rotation, α.

$$x_{cmd} = \cos(\alpha)x_{sense} - \sin(\alpha)y_{sense}$$

$$y_{cmd} = \sin(\alpha)x_{sense} + \cos(\alpha)y_{sense} \quad (2)$$

Finally, substituting equations (1) into equations (2), $x_{cmd}$ and $y_{cmd}$ can be expressed in terms of $x_{sense}$ and $y_{sense}$. After some simplification, $x_{cmd}$ and $y_{cmd}$ can be expressed as:

$$x_{cmd} = g_{x2}(NE-SW) + g_{x1}(NW-SE) + g_{x0}$$

$$y_{cmd} = g_{y2}(NE-SW) + g_{y1}(NW-SE) + g_{y0} \quad (3)$$

The g terms in equations (3) are referred to as the gain coefficients and will need to be calculated based on the positional data.

Figure 8A:
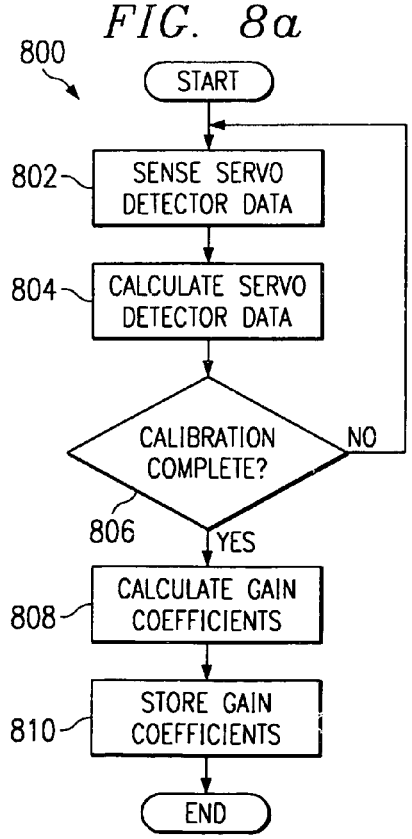

Referring now to FIG. 8a, a flow diagram displays the algorithm 800 for determining the compensation using a least squares estimation technique according to a preferred embodiment of the present invention. The least square estimation method is well understood by those of ordinary skill in the art of the present invention. According to a preferred embodiment of the present invention, the algorithm executes on the processing element of the receiving OWL. As discussed previously, the calibration procedure begins with the transmitting OWL transmitting a calibration packet to the receiving OWL. The transmitting OWL continues its transmissions, moving its light beam in a prespecified pattern and updating the positional data transmitted in its calibration packets.

The receiving OWL polls its servo detectors for its sensed data (block 802) and calculates necessary information from the data values provided to it by its servo detectors (block 804). This calculated data, referred to as measured positional data is saved along with reference positional data. According to a preferred embodiment of the present invention, the reference positional data can either be received from the transmitting OWL or it may be calculated by the receiving OWL since the receiving OWL knows the scan pattern, the starting time of the scan, and the various scan pattern parameters.

This continues until the calibration procedure completes (block 806). With the completion of the calibration procedure, the receiving OWL uses the reference positional data in addition to the measured positional data from its own servo detectors to calculate gain coefficients (block 808). The gain coefficients will be used to provide the transformation needed to provide a common basis. The actual method used to determine the gain coefficients will be discussed below. Once the gain coefficients are calculated, they are stored (block 810) for use whenever the receiving OWL transmits any positional data back to the transmitting OWL.

Using the least square estimation technique to solve equations (3), equations (3) may be expressed in matrix form:

$$[x_n \ y_n] = [pn_n \ pq_n \ 1] \cdot \begin{bmatrix} g_{x2} & g_{y2} \\ g_{x1} & g_{y1} \\ g_{x0} & g_{y0} \end{bmatrix} = [pn_n \ pq_n \ 1] \cdot G \quad (4)$$

where: $x_n$ and $y_n$ are the n-th reference positional data (x, y) in the transmitting OWL's basis, $pn_n$ is the n-th (NE–SW) measured positional data, $pq_n$ is the n-th (NW–SE) measured positional data, the "1" is the offset value, the g's are gain coefficients, and G is gain coefficients matrix. The [$x_n$ $y_n$] matrix is referred to as the XY matrix, the [$pn_n$ $pq_n$ 1] matrix is referred to as the Pr matrix, and the gain coefficients matrix is referred to as the G matrix.

To solve for G, equation (4) is placed in the least square sense:

$$\begin{bmatrix} x_n & y_n \\ \vdots & \vdots \\ x_N & y_N \end{bmatrix} = \begin{bmatrix} pn_n & pq_n & 1 \\ \vdots & \vdots & \vdots \\ pn_N & pq_N & 1 \end{bmatrix} \cdot \begin{bmatrix} g_{x2} & g_{y2} \\ g_{x1} & g_{y1} \\ g_{x0} & g_{y0} \end{bmatrix}$$

$$XY = Pr \cdot G$$

$$G = (Pr^T Pr)^{-1} Pr^T XY \quad (5)$$

Solving for G in the manner displayed in equations (5) is computationally intensive because the values of the Pr matrix are not known until the calibration procedure is performed. Therefore, the highly computational mathematics involved in finding the inverse of a matrix, $(Pr^T Pr)^{-1}$, cannot be precomputed.

It would be possible to precompute the inverse of the XY matrix since the XY matrix contains the reference positional data of the transmitting OWL and is known a priori. This is because the reference positional data is based on the scan pattern of the light beam. To do so requires the computation of the inverse of the G matrix. However, the G matrix is not square and the inverse of a matrix that is not square is undefined. This however, can be remedied by adding a column to the G matrix and making it square. The G matrix with the additional column is referred to as G'. Addition of the column to the G matrix permits the calculation of the inverse of the G' matrix. However, in doing so, the XY matrix also needs to be made square and a column is added to that matrix as well, with the modified XY matrix being referred to as the XY' matrix. Equations (5) are re-written with the new G' and XY' matrices as equations (6). Note that the addition of columns to the G and the XY matrices does not change the final result of the calculations.

$$\begin{bmatrix} x_n & y_n & 1 \\ \vdots & \vdots & \vdots \\ x_N & y_N & 1 \end{bmatrix} = \begin{bmatrix} pn_n & pq_n & 1 \\ \vdots & \vdots & \vdots \\ pn_N & pq_N & 1 \end{bmatrix} \cdot \begin{bmatrix} g_{x2} & g_{y2} & 0 \\ g_{x1} & g_{y1} & 0 \\ g_{x0} & g_{y0} & 1 \end{bmatrix} \quad (6)$$

From equation (6), the solution for the G'inv matrix may be found. For simplicity, the names of the matrix are used in the expression below with no loss in mathematical accuracy.

$XY'=Pr \cdot G'$ $XY' \cdot G'\text{inv} = Pr$ $G'\text{inv} = (XY'^T \cdot XY')^{-1} XY'^T Pr$ $G'\text{inv} = \phi \cdot Pr$ \quad (7)

where: G'inv is the inverse matrix of the G' matrix, $XY'^T$ is the transpose of the XY' matrix, $(XY'^T XY')^{-1}$ is the inverse of the $(XY'^T XY')$ matrix, and $\phi$ is the $(XY'^T XY')^{-1} XY'^T$ matrix, and the · is the standard matrix multiply operation.

Since the transmission pattern followed by the light beam is a predetermined pattern, the transmitting OWL (and the receiving OWL) knows the exact position of the light beam at any given time. As a result, the contents of the XY matrix (and XY' matrix), which contains the reference positional data with the transmitting OWL's basis, are known before the calibration procedure is started. Therefore, the matrix $\phi$ from equation (7) can be precomputed and saved. According to a preferred embodiment of the present invention, the matrix $\phi$ may be stored in the OWL during manufacture, therefore, eliminating the need for the OWL to calculate it at all.

With the matrix $\phi$ precomputed and stored and then G'inv is calculated in the receiving OWL based on information provided to it by the servo detectors, the six gain coefficients from equations (5) and (6) can be calculated. By defining $$\text{DET} = \frac{1}{g'_{00} g'_{11} - g'_{01} g'_{10}}, \text{ the six gain coefficients are:} \quad (8)$$

$g_{x2} = g'_{11} \text{DET}$ $g_{y2} = -g'_{01} \text{DET}$ $g_{x1} = -g'_{10} \text{DET}$ $g_{y1} = g'_{00} \text{DET}$ $g_{x0} = (g'_{10} g'_{21} - g'_{11} g'_{20}) \text{DET}$ $g_{y0} = (g'_{01} g'_{20} - g'_{00} g'_{21}) \text{DET}$ -continued where: the g''s are coefficients of the G'inv matrix:

$$G'\text{inv} = \begin{bmatrix} g'_{00} & g'_{10} & g'_{20} \\ g'_{01} & g'_{11} & g'_{21} \\ g'_{02} & g'_{12} & g'_{22} \end{bmatrix}.$$

The six gain coefficients can then be used to provide compensation for the rotation α, offset, and gain (if any) between the transmitting OWL and the receiving OWL. The six gain coefficients are used to transform any positional data provided to the transmitting OWL by the receiving OWL. Should the receiving OWL need to provide positional data to the transmitting OWL, the gain coefficients can be used to provide the proper transformation required.

Using the least squares estimation technique provides excellent results when the performance of the servo detectors are linear, i.e., the output produced by the servo detectors is linear with respect to the amount of light from the light beam impinging on them. However, there are many servo detector types that do not exhibit a high degree of linearity. For these detectors, a method that ignores the spatial nonlinearity of the detector response will yield better performance.

An alternative to the least squares estimation technique exists that permits the use of servo detectors that do not behave linearly. This alternative uses the discrete Fourier transform (DFT) and is referred to as the DFT estimation technique. DFTs are commonly used transforms and are well understood by those of ordinary skill in the art of the present invention.

DFTs are used to provide coefficients that express a time domain waveform into their constituent frequency domain components. Time domain waveforms, with the exception of simple sinusoids, can be expressed as a summation of multiple sine and cosine waves. The sine and cosine waves are multiples of a single frequency. The single frequency is commonly referred to as a fundamental frequency. According to a preferred embodiment of the present invention, interest is only in the fundamental frequency and the zero frequency, the DC frequency or DC component of the time domain waveform.

Figure 8B:
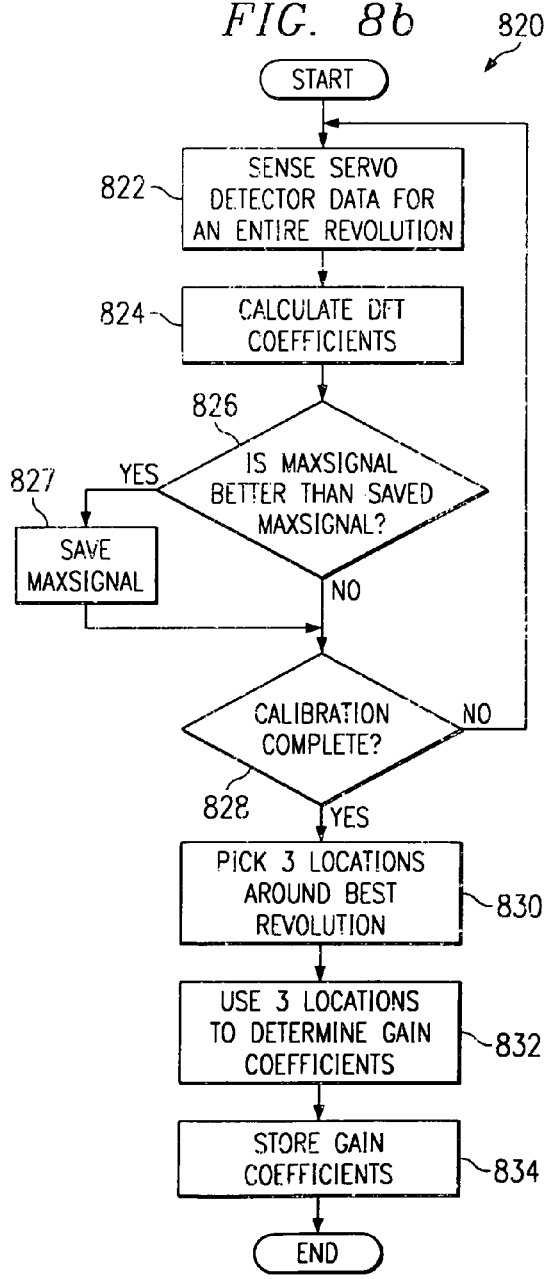

Referring now to FIG. 8b, a flow diagram displays the algorithm 820 for determining the compensation using a DFT estimation technique according to a preferred embodiment of the present invention. According to a preferred embodiment of the present invention, the algorithm executes on the processing element of the receiving OWL. The calibration procedure, when using the DFT estimation technique, operates in a manner similar to the way the procedure operates when using the least squares estimation technique. The transmitting OWL moves its light beam in a prespecified pattern, preferably, a spiral pattern, centered about the position determined during the alignment procedure and the receiving OWL records the data values generated by its servo detectors.

The receiving OWL polls the servo detectors for an entire revolution of the spiral pattern (block 822). From these detector readings, the receiving OWL calculates the DFT coefficients (block 824). The definition of the DFT coefficients is as follows:

$$g_{nc} = \frac{1}{N \cdot rev} \sum_{n=1}^{N \cdot rev} pn_n \cos\left(\frac{2\pi}{N}n\right) \quad g_{qc} = \frac{1}{N \cdot rev} \sum_{n=1}^{N \cdot rev} pq_n \cos\left(\frac{2\pi}{N}n\right) \quad (9)$$

$$g_{ns} = \frac{1}{N \cdot rev} \sum_{n=1}^{N \cdot rev} pn_n \sin\left(\frac{2\pi}{N}n\right) \quad g_{qs} = \frac{1}{N \cdot rev} \sum_{n=1}^{N \cdot rev} pq_n \sin\left(\frac{2\pi}{N}n\right)$$

$$g_{ndc} = \frac{1}{N \cdot rev} \sum_{n=1}^{N \cdot rev} pn_n \qquad g_{qdc} = \frac{1}{N \cdot rev} \sum_{n=1}^{N \cdot rev} pq_n$$

where: $g_{nc}$, $g_{qc}$, $g_{ns}$, and $g_{qs}$ are sine and cosine DFT coefficients of the fundamental frequency, while $g_{ndc}$ and $g_{qdc}$ are sine and cosine DFT coefficients of the zero frequency, rev is the particular revolution of the spiral, $pn_n$ and $pq_n$ are the individual measured positional data and may be the same as in the least squares estimation technique, N is the number of samples in one period or revolution of a preferred spiral. For example, in a spiral pattern with a 50 hz frequency and a 4 khz sampling rate, then the number N would be 80.

After calculation of the DFT coefficients for one entire revolution, the receiving OWL calculated a metric for the revolution referred to as MAXSIGNAL. The expression for MAXSIGNAL is:

$$\text{maxsignal} = g_{nc}^2 + g_{ns}^2 + g_{qc}^2 + g_{qs}^2 \qquad (10).$$

MAXSIGNAL provides a measure of how much the light beam impinges upon the servo detectors. According to a preferred embodiment of the present invention, MAXSIGNAL is compared with a saved MAXSIGNAL that represents the previous greatest MAXSIGNAL (block 826). If the newly calculated MAXSIGNAL is greater than the saved MAXSIGNAL, then the newly calculated MAXSIGNAL is saved along with the revolution number (block 827).

Alternatively, a more complex algorithm may be used for selecting the proper MAXSIGNAL when more than one revolutions with the same MAXSIGNAL is present, i.e., if there are more than one revolutions with the same greatest MAXSIGNAL. If there is more than one revolution with same MAXSIGNAL, then the revolution in the middle of the revolutions will be selected. If there is an even number of revolutions, then one of the two revolutions in the middle will be randomly selected.

This process continues until the entire calibration procedure completes (block 828). Once the calibration procedure is complete, the receiving OWL retrieves the saved MAXSIGNAL along with the revolution number.

With the selected revolution, the receiving OWL can now determine the necessary gain coefficients. The receiving OWL starts off by using the expression for the parameters measured by its servo detectors:

$$pn = g_{nc}\cos\left(\frac{2\pi}{N}n\right) + g_{ns}\sin\left(\frac{2\pi}{N}n\right) + g_{ndc} \qquad (11)$$

$$pq = g_{qc}\cos\left(\frac{2\pi}{N}n\right) + g_{qs}\sin\left(\frac{2\pi}{N}n\right) + g_{qdc}$$

where: N is a number based on the spiral frequency and the sampling rate and the g's are the DFT coefficients calculated in equations (9).

Since the transmission spiral followed by the light beam is prespecified, the positional data can be determined by the following formula:

$$x_{cmd} = A\cos\left(\frac{2\pi}{N}n\right) \qquad (12)$$

$$y_{cmd} = A\sin\left(\frac{2\pi}{N}n\right)$$

where: N is a number based on the spiral frequency and the sampling rate and A is a gain coefficient.

Substituting equations (11) and (12) into equations (3), the gain coefficients can be determined. The equations, expressed in matrix form, are as follows:

$$[x_{cmd} \quad y_{cmd}] = [pn \quad pq \quad 1] \cdot \begin{bmatrix} g_{x2} & g_{y2} \\ g_{x1} & g_{y1} \\ g_{x0} & g_{y0} \end{bmatrix}. \qquad (13)$$

Each column may be solved independently. So, with three equations and three unknowns, it is preferred that three commanded values along the selected revolution is selected (block 830). A convenient set of three commanded values are for the case when n/N=0, ¼, and ½(0, 90 and 180 degrees around a unit circle). The expression using the $X_{cmd}$ commanded values is:

$$\begin{bmatrix} g_{x2} \\ g_{x1} \\ g_{x0} \end{bmatrix} = inv\left(\begin{bmatrix} pn_0 & pq_0 & 1 \\ pn_1 & pq_1 & 1 \\ pn_2 & pq_2 & 1 \end{bmatrix}\right) \cdot \begin{bmatrix} x_{cmd0} \\ x_{cmd1} \\ x_{cmd2} \end{bmatrix} \qquad (14)$$

while for the $Y_{cmd}$ commanded values is:

$$\begin{bmatrix} g_{y2} \\ g_{y1} \\ g_{y0} \end{bmatrix} = inv\left(\begin{bmatrix} pn_0 & pq_0 & 1 \\ pn_1 & pq_1 & 1 \\ pn_2 & pq_2 & 1 \end{bmatrix}\right) \cdot \begin{bmatrix} y_{cmd0} \\ y_{cmd1} \\ y_{cmd2} \end{bmatrix}. \qquad (15)$$

Defining $$DET = \frac{\text{amplitude of } rev \text{ chosen}}{g_{nc}g_{qs} - g_{ns}g_{qc}}$$

and solving equations (14) and (15), the gain coefficients are determined to be (block 832):

$$g_{x2} = +g_{qs} \cdot DET$$

$$g_{x1} = -g_{ns} \cdot DET$$

$$g_{x0} = (+g_{ns}g_{qdc} - g_{ndc}g_{qs}) \cdot DET$$

$$g_{y2} = -g_{qc} \cdot DET$$

$$g_{y1} = +g_{nc} \cdot DET$$

$$g_{y0} = (-g_{nc}g_{qdc} + g_{ndc}g_{qc}) \cdot DET \qquad (16).$$

The six gain coefficients are then saved (block 834). The six gain coefficients can be used to provide needed transformation to any positional data transmitted from the receiving OWL to the transmitting OWL. The six gain coefficients are used to transform any positional data provided to the transmitting OWL by the receiving OWL.

For systems that use optical detectors that exhibit a highly non-linear behavior, both the least squares and DFT estimation techniques may not perform optimally. It is preferred to not attempt to fit a linear equation to such non-linear data. Therefore, a technique that provides a measure of immunity to detector non-linearity is preferred. One such technique uses actual measured positional data (as measured by the optical detectors of the receiving OWL) to derive orientation and scaling information to provide positional data for the transmitting OWL.

This technique is referred to as a table look-up technique and preferably uses a two-dimensional look-up table to produce the orientation and scaling with respect to the transmitting OWL. According to a preferred embodiment of the present invention, a look-up table is used to store measured positional data at a plurality of positions throughout a specified field of view and during normal operation, the receiving OWL would periodically take measured position data, perform a reverse look-up using the look-up table to determine positional data for the transmitting OWL and provide that data to the transmitting OWL. In addition to being able to support optical detectors with a high degree of non-linearity, the table look-up method can be simpler to calibrate.

Referring now to FIG. 8c, a flow diagram displays an algorithm 850 for determining a look-up table for use in a table look-up technique according to a preferred embodiment of the present invention. According to a preferred embodiment of the present invention, the algorithm 850 executes on a processing element of a transmitting OWL and is performed at power-up or whenever an existing link between OWLs are broken and requires re-establishment.

The transmitting OWL begins by transmitting a control packet to the receiving OWL (block 852). According to a preferred embodiment of the present invention, the control packet contains information that tells the receiving OWL that the transmitting OWL is going to begin a calibration. The control packet may also carry other information such as information specifying the pattern that the transmitting OWL will traverse with its light beam, the frequency at which it will transmit positional information, etc. After transmitting the control packet, the transmitting OWL begins to move its light beam in the previously specified pattern (block 854).

After completing the pattern, the transmitting OWL waits to receive a response control packet from the receiving OWL (block 856). The response control packet will contain, among other data, a radius of dynamic range. The radius of dynamic range is used to scale the dimensions of a second pattern that it will trace out with its light beam. More details on the radius of dynamic range and pattern scaling will be provided below.

Once the transmitting OWL receives the radius of dynamic range information, it will scale the second pattern of its light beam according the radius (block 858) and will begin tracing out the second pattern with its light beam (block 860). Part of the second pattern includes a specified number of locations that may correspond to positions in the look-up table. Rather than transmitting positional information as it moves its light beam in the scaled pattern, at each position, the transmitting OWL holds its light beam stationary for a specified amount of time that is sufficient to permit the receiving OWL to obtain multiple polls of measured positional data from its servo detectors. According to a preferred embodiment of the present invention, the transmitting OWL holds its light beam at each position to permit the receiving OWL to poll its servo detectors 125 times and each move between positions is of duration to permit 25 polls, all with a sampling rate of 5 khz. The transmitting OWL finishes after it completes moving its light beam.

Figure 8D:
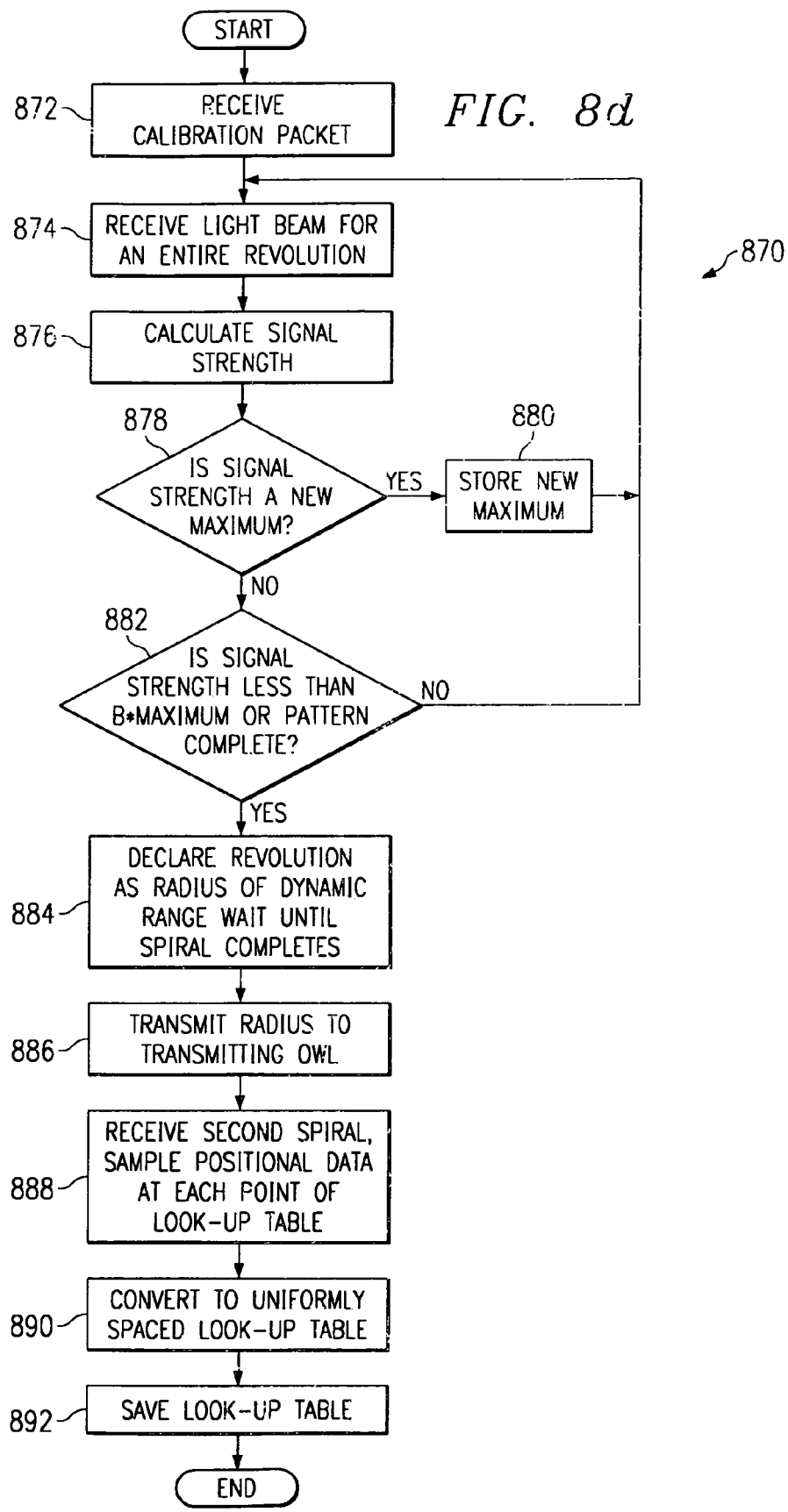

Referring now to FIG. 8d, a flow diagram displays an algorithm 870 for determining a look-up table for use in a table look-up technique according to a preferred embodiment of the present invention. According to a preferred embodiment of the present invention, the algorithm 870 executes on a processing element of a receiving OWL and executes when the receiving OWL receives a calibration initiation control packet from the transmitting OWL.

The receiving OWL begins when it receives a calibration initiation packet from the transmitting OWL (block 872). After receiving the calibration initiation packet, the receiving OWL polls its servo detectors for one entire revolution of the light beam (block 874). With the polled data, the receiving OWL calculates a metric for the revolution's data. According to a preferred embodiment of the present invention, the metric is referred to as a signal strength and is expressible as a function of the measured positional data as:

$$signalStrength = \sum_{\substack{positional \\ data}} (NE^2 + SE^2 + SW^2 + NW^2) \qquad (17)$$

where NE, SE, SW, and NW are data associated with servo detectors in a preferred embodiment of the present invention with four servo detectors, and the summation covers all measured positional data for the entire revolution.

After calculating the signal strength metric, the receiving OWL compares the signal strength metric with a maximum signal strength metric (block 878). The maximum strength metric represents the largest calculated signal strength metric calculated during the current calibration procedure. If the signal strength metric is equal to or larger than the maximum signal strength metric, then it is declared the new maximum signal strength metric and stored (block 880) and the receiving OWL returns to block 874 to receive another revolution's worth of positional data. If the signal strength metric is not larger than the maximum signal strength metric, then the receiving OWL compares the signal strength metric with a fraction of the maximum signal strength metric and it also checks to determine if the transmitting OWL has completed its pattern (block 882). According to a preferred embodiment of the present invention, the preferred value of the fraction is ⅛th or 12.5 percent of the maximum signal strength metric, although other fractions of the maximum signal strength metric are acceptable.

Should the signal strength metric be smaller than the scaled maximum signal strength metric or if the transmitting OWL has completed its pattern, the revolution is declared to be a radius of dynamic range of the remote sensors (block 884). The radius of dynamic range represents a point in the pattern traversed by the light beam of the transmitting OWL beyond which an insignificant amount of its light impinges upon the receiving OWL's servo sensors. The light beam, when it is beyond the radius of dynamic range, impinges so little (or none at all) that noise detected by the servo detectors is beginning to affect the performance of the network.

The radius of dynamic range can cover a large or a small percentage of the range of motion of the light beam of the transmitting OWL, depending on the distance separating the two OWLs. Once the radius of dynamic range has been determined, the receiving OWL transmits the radius of dynamic range to the transmitting OWL (block 886).

As discussed previously, after the transmitting OWL receives the radius of dynamic range, it will scale a second pattern and begin tracing the second pattern with its light beam. As the transmitting OWL traces the second pattern with its light beam, the receiving OWL polls its servo detectors for positional data (block 888). According to a preferred embodiment of the present invention, the transmitting OWL pauses its light beam at predetermined positions to allow the receiving OWL to poll its servo detectors a total of 125 times at each position. Additionally, the receiving OWL is able to poll its servo detectors a total of 25 times each time the transmitting OWL moves its light beam from position to position.

At each position of the light beam, the receiving OWL averages the positional data it polls from its servo detectors to generate a pair of averaged sensor readings for each position. The sensor readings (for a preferred receiving OWL with four servo detectors) is expressed as:

$$remote_x = \sum_{\substack{positional \\ data}} (NE + SE - SW - NW) \quad (18)$$

$$remote_y = \sum_{\substack{positional \\ data}} (NE - SE - SW + NW)$$

where NE, SE, SW, and NW are data associated with the servo detectors and the summation covers all polled measured positional data for the position. While the sensor readings are being calculated, the receiving OWL is also maintaining the most positive and most negative $remote_x$ and $remote_y$ values, stored as $remote_{xmax}$, $remote_{xmin}$, $remote_{ymax}$, and $remote_{ymin}$.

Each pair of sensor readings is associated with each position in a look-up table. However, due to the high non-linearity of the servo detectors, it is likely that the sensor readings are not uniformly spaced while the positions are uniformly spaced. It is preferred that a second look-up table is generated with interpolated sensor reading data to provide a look-up table that is uniformly spaced, both in terms of sensor readings and positions (block 890). This second look-up table is stored along with the $remote_{xmax}$, $remote_{xmin}$, $remote_{ymax}$, and $remote_{ymin}$ values (block 892) for later use and the calibration procedure is complete.

According to a preferred embodiment of the present invention, during normal operations, the receiving OWL periodically polls its servo detectors and uses the data provided by the detectors to calculate measured positional data. With this measured positional data, the receiving OWL performs a look-up into the look-up table to determine a position associated with the measured positional data. The receiving OWL then transmits the position back to the transmitting OWL for use in making adjustments to the aim of its light beam.

According to another preferred embodiment of the present invention, if there is not an exact match in the measured positional data with the stored sensor data, then the receiving OWL is required to perform interpolation to determine the position. The interpolation process is as follows. First, the receiving OWL takes polled the data from the servo detectors and generates measured positional data, a pair of sensor readings, which can be expressed as:

$$remote_x = NE + SE - SW - NW$$

$$remote_y = NE - SE - SW + NW \quad (19)$$

Then, from the measured positional data, the receiving OWL calculates look-up table entries:

$$tentry_x = trunc(s_{x1} remote_x + remote_{xmin}) \quad (20)$$

$$tentry_y = trunc(s_{y1} remote_y + remote_{ymin})$$

where $$s_{x1} = \frac{NumTableEntries}{remote_{xmax} + remote_{xmin}}$$

$$s_{y1} = \frac{NumTableEntries}{remote_{ymax} + remote_{ymin}}$$

and the trunc( ) operator truncates a numerical value to a specified number of decimal places.

The table look-up entries $tentry_x$ and $tentry_y$ are then used to calculate positional data ($x_{cmd}$ and $y_{cmd}$) to be provided to the transmitting OWL. The expressions for $x_{cmd}$ and $y_{cmd}$ are:

$$x_{cmd} = (table_x(tentry_x+1) - table_x(tentry_x))*(remote_x s_{x1} - tentry_x) + table_x(tentry_x)$$

$$y_{cmd} = (table_y(tentry_y+1) - table_y(tentry_x))*(remote_y s_{y1} - tentry_y) + table_y(tentry_y) \quad (21)$$

where $table_x( )$ and $table_y( )$ are functions returning x and y entries from the look-up table.

Referring now to FIG. 9, a diagram illustrates an optical module 910 according to a preferred embodiment of the present invention. The module includes an Encoder/Decoder Unit 920, coupled by a two-way Data Link 925 to an Optical Transceiver Unit (OTU) 930. The OTU 930 acts as an electrical to light and light to electrical converter. It contains a light source, such as a laser or light emitting diode, control electronics for the light source, a photo-detector for converting the received light to electrical signals and amplifiers to boost the electrical strength to a level that is compatible with the decoder.

The OTU 930 can also be of conventional design. For example, a TTC-2C13 available from TrueLight Corporation of Taiwan, R.O.C., provides an advantageous and low cost optical transceiver unit, requiring only a single +5V power supply, consuming low power, and providing high bandwidth. However, it should be noted that OTU units of conventional design can provide less than optimal performance, since such units are typically designed for transmitting and receiving light from fibers. This results in three problems that should be noted by the designer. First, light is contained in such units and is thus not subject to the same eye safety considerations as open air optical systems such as the present invention. Consequently, such units may have excessively high power. Second, light is transmitted to a fiber and thus has optical requirements that are different from those where collimation is required, as in embodiments of the present invention. Third, light is received by such units from a narrow fiber, and therefore such units usually have smaller detector areas than desired for embodiments of the present invention. Accordingly, it is considered preferable to assemble a transceiver having a photodiode and optical design such that the maximum amount of light is collected from a given field of view. This requires as large a photodiode as possible, with the upper limit being influenced by factors such as photodiode speed and cost. In any event source, a preferred light source is a vertical cavity surface emitting laser, sometimes referred to as a VCSEL laser diode. Such laser diodes have, advantageously, a substantially circular cross-section emission beam, a narrow emission cone and less dependence on temperature.

The Optical Transceiver Unit 930 is coupled by a two-way data link 935 to Optics 940. The Optics 940 contains optical components for collimating or focusing the outgoing light beam 150 from the transceiver, a micro-mirror controlled by, e.g., electromagnetic coils, for directing the collimated light in the direction of a second OWL (not shown), with which OWL is in communication, and receiving optics to concentrate the light received from the second OWL on a transceiver photodetector included in the Optics 940. The receiving optics can include a control mirror, either flat or curved, to direct the light to the photodetector. Auxiliary photo detectors can be provided adjacent to the main photodetector for light detection in connection with a control subsystem (not shown), for controlling the control mirror, and maximize the light capture at the photodetector. The Optics 940 may also contain a spectral filter 945 to filter ambient light from the incoming signal light 140. The Optics 940 is preferably, but need not be a micro-mirror. Any controllable beam steering device can be used that changes the direction of the light beam without changing the orientation of the light emitter. In addition, a basic function of the Optics 940 is that it sufficiently collimates the light beam that will (1) substantially fit within the micro-mirror reflecting area, and (2) preserve the minimum detectable power density over the distance of the link. Laser diodes generally meet these criteria, and as such are preferred. However, light emitting diodes (LEDs) and other light sources can be made to satisfy these criteria as well.

For optical wireless links across large distances where the highest possible optical power density at the receiver is needed for robust transmission, the optical portion of the preferred embodiments should preferably be selected to achieve a divergence of approximately 1 mrad, which is to be contrasted with the prior art system that have divergences in the range of 2.5 mrad. The divergence of less than 0.5 mrad results in an optical density greater than 5 times the optical density of the prior art systems, which, for the same received optical power density corresponds to 2 or more times longer range.

The optical receiver portion of this embodiment should be selected to have an intermediate size, preferably having a diameter in the range of 0.5 millimeter (mm) to 1 centimeter (cm). If the diameter is much smaller than 0.5 mm, it may be difficult to collect enough of the light directed on the receiver. On the other hand, if the diameter is much larger than 1 cm, the responsiveness of the detector may diminish to the point where the performance of the system is compromised.

It should also be understood that more than one Optical Transceiver Unit 930 may be provided in some embodiments, for example to provide multiple wavelengths to transmit information across a single link, in order to increase the bandwidth of a given OWL link. This involves generating light beams having multiple wavelengths and collecting and separating these separate light beams. Numerous apparatus and methods are taught in co-pending patent application Ser. No. 09/839,690, filed 4/20/2001 and incorporated herein by reference.

The Optics 940 are coupled by an optical path 950 to a Position Sensitive Detector ("PSD") 955. According to a preferred embodiment of the present invention, this detector may be an array of four detectors as previously described or an array of three detectors or a two-dimensional planer device that received a portion of the beam by means of an optical beam splitter.

The analog signals representing these angular deflections are converted into signals and sent on lines 960 to a Digital Signal Processor ("DSP") 905 for closed loop control of the micro-mirror in Optics 840. PSDs are well known in the art, and PSD 955 may be any of a variety of types, including a single diode Si PSD, CMOS photo-detector array, and the like. All that is required of PSD 955 is that it senses in two directions, and provides a set of mathematically independent output values. These values can then be used to form a basis that can be transformed by the gains calculated in the orientation calibration routine into the frame of reference of the transmitting OWL. However, note that the use of analog control signals is not required in the practice of the present invention. Other known control signal approaches can be used. For example, pulse-width modulation may be used to provide such control. Such choices of control system are well within the purview of those of ordinary skill in this art.

In addition to receiving the signal lines 960 from the PSD 955, the DSP 905 sends coil control signals on lines 965 to a set of digital to analog converters ("D/As") 970. The D/As 970 are, in turn, connected by way of lines 975 to a corresponding set of coils in Optics 940. Finally, the DSP 905 is connected via line 980 to send and receive Operational/Administration/Maintenance (OAM) data to/from Encoder/Decoder 920. The DSP 905 operates as a link control. It controls the micro-mirror deflections by controlling the coil currents through the D/As 970. Information on the instantaneous micro-mirror deflections is received from the PSD 955 for optional closed loop control. The DSP 905 also exchanges information to the second OWL to orient the beam steering micro-mirror in the proper direction for the link to be established and maintained. The DSP 905 may also exchange OAM information with the second OWL across the optical link maintained by Optical Module 940. DSP 905 may be any suitable DSP, of which many are commercially available. Preferably, the DSP is the DSP provided for by control logic, as discussed above, although a second distinct DSP could optionally be used. In addition, note that a single processor may control multiple OWL links. This capability can be very valuable for use in a network hub, where multiple links originate or terminate in a single physical network switch. A single DSP could provide a very cost efficient control facility in such cases. In all such cases, the requirements for this processor are a sufficiently high instruction processing rate in order to control the specified number of micro-mirrors, and a sufficient number of input/output ("I/O") ports to manage control subsystem devices and peripheral functions.

In the above descriptions of different embodiments of orientation calibration procedures, the receiving OWL performed the necessary calculations and computations and then provided the transmitting OWL with positional information in the frame of reference of the transmitting OWL. In an alternative preferred embodiment of the present invention, the receiving OWL would transmit raw positional data to the transmitting OWL and the transmitting OWL would perform the calculations and computations. Additionally, the receiving OWL would continue to transmit raw positional data and the transmitting OWL will perform the necessary transformations to convert the raw data into its own frame of reference.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for providing a common coordinate basis between two optical wireless units wherein information is transmitted between the optical wireless units via light beams, the method comprising:
  at the first optical wireless unit:
    moving the light beam in a first prespecified pattern;
    receiving detector range data from the second optical wireless unit; and
    moving the light beam in a second prespecified pattern;
  at the second optical wireless unit:
    determining detector range;
    transmitting the detector range; determining reference positions;
    generating a table of detector readings; and
  wherein the first prespecified pattern is a spiral pattern with a specified number of revolutions, first determining step comprising:
    calculating a signal strength metric for each revolution;
    maintaining a maximum signal strength;
    comparing the signal strength metric with a threshold;
    setting a radius of dynamic range of a search pattern about remote detectors at the second optical wireless unit if the signal strength metric is less than the threshold; and
    transmitting the radius to the first optical wireless unit.

2. The method of claim 1, wherein the second optical wireless unit senses the light beam with its optical detectors, a plurality of times per revolution of the light beam, the signal strength metric is expressed as:

$$signalStrength = \sum_{\substack{positional \\ data}} (NE^2 + SE^2 + SW^2 + NW^2)$$

where: NE, SE, SW, and NW are data provided by the optical detectors and the summation is over all measured positional data points in a single revolution.

3. The method of claim 1, wherein the threshold is a small fraction of the maximum signal strength.

4. The method of claim 3, wherein the threshold is 12.5 percent of the maximum signal strength.

5. The method of claim 1, wherein the radius of dynamic range is the revolution whose signal strength is less than the threshold.

6. The method of claim 1, wherein the radius of dynamic range is the final revolution of the spiral if the signal strength of all the revolutions are greater than the threshold.

7. The method of claim 1, wherein the second prespecified pattern is scaled according to the received detector range data.

8. The method claim 1, wherein the light beam pauses at each reference position as it follows the second prespecified pattern, the generating step comprising:
  polling the optical detectors for data as the light beam pauses; and saving the polled data.

9. The method of claim 8, wherein the second optical wireless unit polls the optical detectors for data a plurality of times as the light beam pauses and computes an average of the data.

10. The method of claim 8, wherein the generating step further comprising: linearizing the data in the table; and creating a second table with the linearized data.

11. A method for providing a common coordinate basis between two optical wireless units wherein information is transmitted between the optical wireless units via light beams, the method comprising:
  at the first optical wireless unit:
    moving the light beam in a first prespecified pattern;
    receiving detector range data from the second optical wireless unit; and
    moving the light beam in a second prespecified pattern;
  at the second optical wireless unit:
    determining detector range;
    transmitting the detector range;
    determining reference positions;
    generating a table of detector readings and,
  wherein the method further comprises
    selecting a position from the table based on an optical detector reading comprising
      polling the optical detectors for an optical detector reading, wherein the optical detector reading is determined from data provided by the Plurality of optical detectors and is expressed as:

$$remote_x = NE + SE - SW - NW$$

$$remote_y = NE - SE - SW + NW$$

where: $remote_x$ and $remote_y$ are the optical detector readings, and NE, SE, SW, and NW are data from the optical detectors;
    generating a set of table indices; and
    selecting a position using the set of table indices
      wherein the set of table indices are generated from the optical detector reading and is expressed as:

$$tentry_x = trunc(s_{x1} remote_x remote_{xmin})$$

$$tentry_y = trunc(s_{y1} remote_y remote_{ymin})$$

where: $s_{x1} = \dfrac{NumTableEntries}{remote_{xmax} + remote_{xmin}}$  $s_{y1} = \dfrac{NumTableEntries}{remote_{ymax} + remote_{ymin}}$, NumTableEntries is a number of entries in the table, $remote_{xmax}$, $remote_{xmin}$, $remote_{ymax}$, and $remote_{ymin}$ are maximum and minimum values along columns and rows of the table, and the trunc( ) operator truncates a numerical value to a specified number of decimal places; and
    transmitting the position to the first optical wireless unit after generating the table.

12. The method of claim 11, wherein the position is stored in the table and is selected via the expressions:

$$x_{cmd} = (table_x(tentry_x+1) - table_x(tentry_x))*(remote_x S_{x1} - tentry_x) + table_x(tentry_x)$$

$$y_{cmd} = (table_y(tentry_y+1) - table_y(tentry_y))*(remote_y S_{y1} - tentry_y) + table_y(tentry_y) \qquad (21)$$

where $table_x( )$ and $table_y( )$ are functions returning x and y entries from the table.

* * * * *